United States Patent
Karmakar et al.

(10) Patent No.: US 9,404,054 B2
(45) Date of Patent: Aug. 2, 2016

(54) TUBULAR RADIANT SYNGAS COOLER

(71) Applicant: General Electric Company, Schenectady, NY (US)

(72) Inventors: Pallab Karmakar, Bangalore (IN); Rajeshwar Sripada, Bangalore (IN); Atul Kumar Vij, Bangalore (IN); Naresh Amineni, Bangalore (IN)

(73) Assignee: General Electric Company, Schenectady, NY (US)

( * ) Notice: Subject to any disclaimer, the term of this patent is extended or adjusted under 35 U.S.C. 154(b) by 267 days.

(21) Appl. No.: 14/136,678

(22) Filed: Dec. 20, 2013

(65) Prior Publication Data

US 2015/0175915 A1    Jun. 25, 2015

(51) Int. Cl.
  *B01J 7/00*   (2006.01)
  *C10J 3/84*   (2006.01)
  *C10K 1/04*   (2006.01)
  *C10J 3/74*   (2006.01)
  (Continued)

(52) U.S. Cl.
  CPC .. *C10J 3/845* (2013.01); *C10J 3/74* (2013.01); *C10J 3/84* (2013.01); *C10K 1/04* (2013.01); *C10K 1/046* (2013.01); *F23B 90/06* (2013.01); *F28D 7/1676* (2013.01); *F28F 9/028* (2013.01); *F28F 13/08* (2013.01); *F28F 19/00* (2013.01); *C10J 2300/0903* (2013.01); *C10J 2300/0959* (2013.01); *C10J 2300/0976* (2013.01); *C10J 2300/1678* (2013.01); *C10J 2300/1846* (2013.01); *F28D 2021/0075* (2013.01); *Y02E 20/18* (2013.01)

(58) Field of Classification Search
  CPC .......... F28D 2021/0075; F28D 7/1669; F28D 7/0041; F28D 7/00; F28D 7/1676; C10J 3/485; C10J 3/845; C10J 3/86
  See application file for complete search history.

(56) References Cited

U.S. PATENT DOCUMENTS

| | | | | |
|---|---|---|---|---|
| 4,377,132 A | * | 3/1983 | Koog | ................. C10J 3/86 122/7 R |
| 4,466,384 A | * | 8/1984 | Maurer | ................. C10J 3/86 122/392 |

(Continued)

FOREIGN PATENT DOCUMENTS

| | | |
|---|---|---|
| GB | 1549736 A | 8/1979 |
| WO | 2012028550 A1 | 3/2012 |

OTHER PUBLICATIONS

European Search Report and Opinion issued in connection with corresponding EP Application No. 14198602.6 on Apr. 20, 2015.

*Primary Examiner* — Imran Akram
(74) *Attorney, Agent, or Firm* — Fletcher Yoder, P.C.

(57) ABSTRACT

A system includes a gasifier that may gasify a feedstock to produce a syngas and a syngas cooler that includes a cooling chamber having a tapered configuration. The cooling chamber includes a first section that may separate particulates from the syngas and includes a first opening and a second opening. The first opening has a smaller width than the second opening. The system also includes a second section in fluid communication with the first section that includes a plurality of tubes surrounding the first section. A first portion of the plurality of tubes is arranged parallel to a longitudinal axis of the cooling chamber and a second portion of the plurality of tubes is angled such that the second portion of the plurality of tubes forms the tapered configuration. The system further includes a passage to flow a seal gas between a shell of the radiant syngas cooler and the second section. The shell encloses the cooling chamber.

16 Claims, 6 Drawing Sheets

(51) Int. Cl.
*F28F 13/08* (2006.01)
*F28D 7/16* (2006.01)
*F28F 9/02* (2006.01)
*F28F 19/00* (2006.01)
*F23B 90/06* (2011.01)
*F28D 21/00* (2006.01)

(56) References Cited

U.S. PATENT DOCUMENTS

| | | | |
|---|---|---|---|
| 4,535,727 A * | 8/1985 | Ziegler | C10J 3/86 122/32 |
| 7,730,616 B2 | 6/2010 | Goller et al. | |
| 2008/0011247 A1 * | 1/2008 | Alexander | C10J 3/86 122/7 D |
| 2008/0041572 A1 | 2/2008 | Wessel et al. | |
| 2008/0042373 A1 * | 2/2008 | Wilson | C10J 3/485 277/631 |
| 2008/0175769 A1 * | 7/2008 | Goller | F28D 7/1669 422/201 |
| 2009/0047193 A1 * | 2/2009 | Corry | C10J 3/06 422/200 |
| 2009/0202403 A1 * | 8/2009 | Jimenez-Huyke | C01B 3/36 422/198 |
| 2010/0263841 A1 | 10/2010 | Corry et al. | |
| 2011/0120009 A1 * | 5/2011 | Klockow | B01D 47/021 48/87 |
| 2014/0048744 A1 * | 2/2014 | Avagliano | C10K 1/04 252/372 |
| 2015/0137040 A1 * | 5/2015 | Pan | C10J 3/485 252/373 |

* cited by examiner

TUBULAR RADIANT SYNGAS COOLER

BACKGROUND

The subject matter disclosed herein relates to gasification systems and, more particularly, to systems for cooling syngas.

Gasifiers convert carbonaceous materials into a mixture of carbon monoxide and hydrogen, referred to as synthesis gas or syngas. For example, a gasification system includes one or more gasifiers that react a feedstock at a high temperature with oxygen and/or steam to produce syngas. The syngas may be used for power generation, chemical production, or any other suitable application. Prior to use, the syngas may be cooled in a syngas cooler and treated in a gas treatment system.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a system includes a gasifier that may gasify a feedstock to produce a syngas and a syngas cooler that includes a cooling chamber having a tapered configuration. The cooling chamber includes a first section that may separate particulates from the syngas and includes a first opening and a second opening. The first opening has a smaller width than the second opening. The system also includes a second section in fluid communication with the first section that includes a plurality of tubes surrounding the first section. A first portion of the plurality of tubes is arranged parallel to a longitudinal axis of the cooling chamber and a second portion of the plurality of tubes is angled such that the second portion of the plurality of tubes forms the tapered configuration. The system further includes a passage to flow a seal gas between a shell of the syngas cooler and the second section. The shell encloses the cooling chamber.

In another embodiment, a system includes a cooling chamber having a first section including a first opening and a second opening. The first opening may receive a syngas from a gasifier and has a smaller width than the second opening. The system also includes a second section in fluid communication with the first section and includes a plurality of tubes. A first portion of the plurality of tubes is arranged parallel to a longitudinal axis of the vessel and a second portion of the plurality of tubes is angled such that the second portion of the plurality of tubes forms a tapered configuration. The system further includes a wall that may separate the first section from the second section. The wall may block a flow of the syngas into the second section.

In a further embodiment, a method includes flowing a syngas from a gasifier into a syngas cooler that includes a first section having a first opening and a second opening. The first opening has a smaller width than the second opening. The syngas cooler also includes a second section including a plurality of tubes surrounding the first section. A portion of the plurality of tubes coincides with an inner wall of the syngas cooler, and the inner wall is angled from the first opening to the second opening to define a tapered configuration. The method also includes decreasing a velocity of the syngas within the first section. The velocity is decreased via diffusion of the syngas in a first tapered configuration. The method further includes routing the syngas to the second section via the second opening. A second flow direction of the syngas in the second section is generally opposite from a first flow direction of the syngas in the first section.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
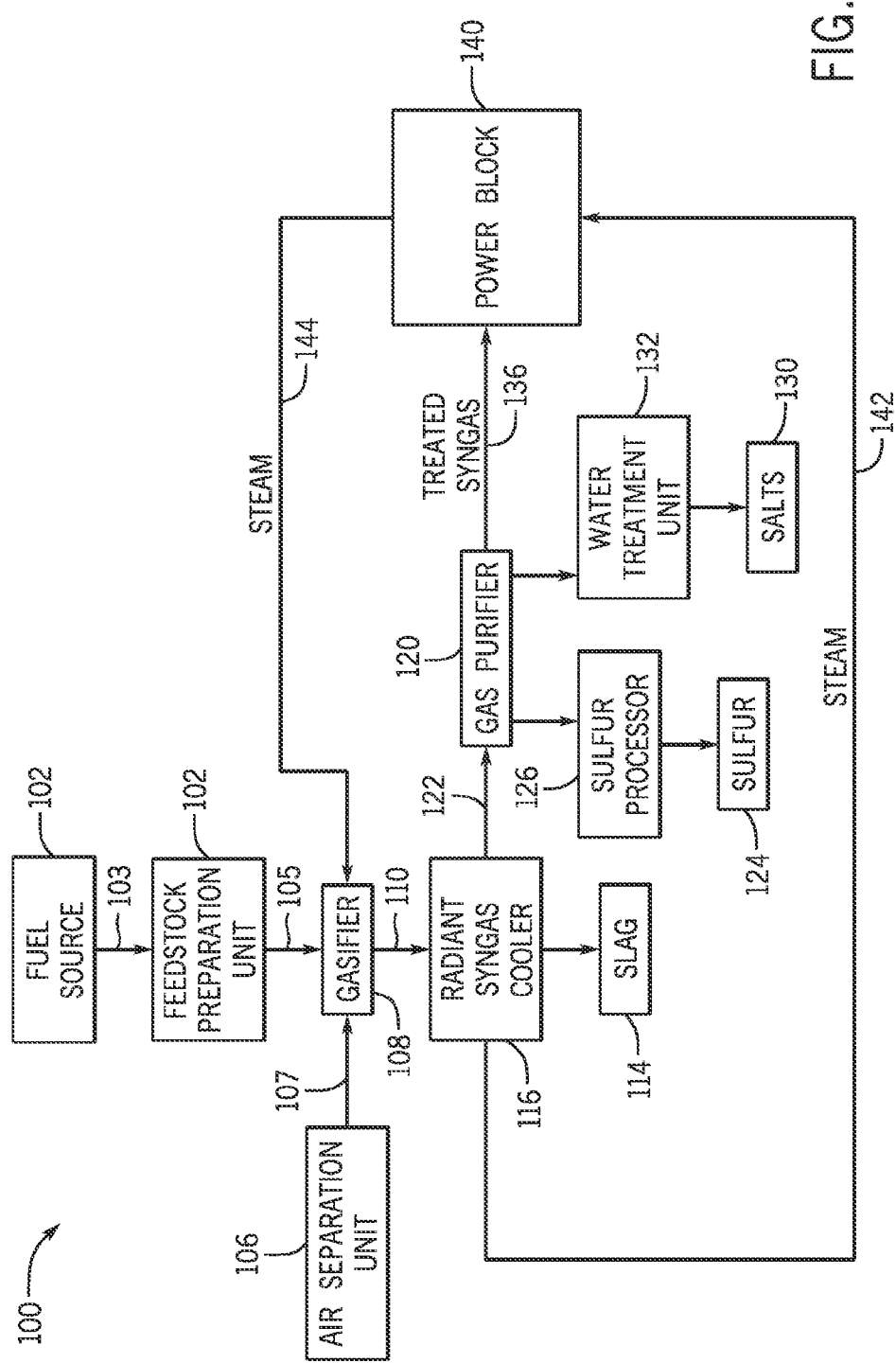
FIG. 1 is a schematic block diagram of an embodiment of a gasification system including a syngas cooler.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, the disclosed embodiments include a gasification system including a syngas cooler, e.g., radiant syngas cooler (RSC), designed to reduce fouling of heat transfer surfaces and increase cooling efficiency. Generally, during gasification, a fuel source undergoes partial oxidation in a gasifier to produce a syngas. The resultant syngas exits the gasifier and enters the RSC at a high temperature and a high pressure. Accordingly, the syngas may be cooled to a desired temperature before further processing (e.g., removal of gasification by-products). Cooling performance of the RSC may depend on natural convection and radiative heat transfer of the syngas and heat transfer surfaces. However, fouling of heat transfer surfaces may reduce the overall performance of the RSC. For example, the resultant syngas may include by-products (e.g., slag, fly ash, sulfides, and the like) that may form deposits on the heat transfer surfaces of the RSC. As such, heat transfer surfaces containing by-product deposits may not participate in heat transfer, reducing the overall efficiency of the RSC. The fouling of heat transfer surfaces may be minimized by changing flow patterns and/or reducing velocity of the syngas within the RSC during cooling. The syngas flow patterns may be influenced by a configuration of the RSC. Accordingly, provided herein is an RSC having a configuration that adjusts syngas flow patterns and increases cooling of the syngas.

By incorporating a tapered configuration into the RSC, the overall cooling efficiency of the RSC may be increased. For example, the tapered configuration may cause the syngas to spread out (e.g., diverge away from a central axis) within the RSC such that the syngas fills the tapered configuration. As the syngas diffuses, a velocity of the syngas decreases and a residence time of the syngas within the RSC may be increased, resulting in more efficient cooling. In addition, convective heat transfer of the syngas is facilitated by the diffusion, further increasing the cooling efficiency of the RSC. Furthermore, the tapered configuration of the RSC may reduce fouling of heat transfer surfaces within the RSC due to lower impingement velocity of syngas.

FIG. 1 is a block diagram showing an embodiment of a gasification system 100 such as, but not limited to, an integrated gasification combined cycle (IGCC) system, a methanol-to-olefin chemical plant (MTO), and/or a synthetic natural gas chemical plant (SNG). The gasification system 100 includes a gasifier that may produce a syngas and a syngas cooler, e.g., radiant syngas cooler (RSC), that may cool the syngas. Elements of the gasification system 100 may include a fuel source 102, such as a solid feed 103, that may be utilized as a source of energy for the gasification system 100. The fuel source 102 may include coal, petroleum coke, biomass, wood-based materials, agricultural wastes, tars, coke oven gas, asphalt, heavy residues from a refinery, or other carbon containing items.

The fuel of the fuel source 102 may be passed to a feedstock preparation unit 104. The feedstock preparation unit 104 may, for example, resize or reshape the fuel source 102 by chopping, milling, shredding, pulverizing, briquetting, or pelletizing the fuel source 102 to generate feedstock 105. Accordingly, the feedstock preparation system 104 may include one or more grinders, mills, or any similar unit that may produce smaller particles from large particles of the fuel source 102 during operation. Additionally, water, or other suitable liquids may be added to the fuel source 102 in the feedstock preparation unit 104 to create slurry feedstock. In other embodiments, no liquid is added to the fuel source, thus yielding dry feedstock. In further embodiments, the feedstock preparation unit 104 may be omitted if the fuel source 102 is a liquid.

The gasification system 100 (e.g., IGCC, MTO, or SNG) may further include an air separation unit (ASU) 106. The ASU 106 may operate to separate air into component gases by, for example, distillation techniques. The ASU 106 may separate oxygen 107 from the air supplied to it from a supplemental air compressor, and the ASU 106 may transfer the separated oxygen 107 to a gasifier 108.

The feedstock 105, and in certain embodiments, the oxygen 107 from the ASU 106, may be passed to the gasifier 108 (e.g., a partial oxidation vessel) from the feedstock preparation unit 104. As will be described in more detail below, the gasifier 108 includes a reactor or a reaction chamber disposed in a gasification vessel to enable gasification to produce a syngas 110. The gasifier 108 may convert the feedstock 105 into the syngas 110, e.g., a combination of carbon monoxide (CO) and hydrogen. This conversion may be accomplished by subjecting the feedstock 105 to a controlled amount of steam 112 and an oxidizer 107 (e.g., pure oxygen, air, or a mixture thereof) at elevated pressures, e.g., from approximately 20 bar to 85 bar, and temperatures, e.g., approximately 700 degrees Celsius (C) to 1600 degrees C., depending on the type of gasifier 108 utilized. The gasifier 108 may be an updraft or downdraft fixed-bed gasifier, a fluidized-bed gasifier, such as a bubbling fluidized-bed gasifier or a circulating fluidized-bed gasifier, or moving bed gasifier. During the gasification process, the feedstock may undergo a pyrolysis process, whereby the feedstock is heated. Temperatures inside a gasification chamber of the gasifier 108 may range from approximately 150 degrees C. to 700 degrees C. during the pyrolysis process, depending on the fuel source 102 utilized to generate the feedstock 105.

The volatiles generated during the pyrolysis process, also known as devolatilization, may be partially combusted by introducing an oxidant 107 to the gasifier 108. The volatiles may react with the oxidant 107 to form $CO_2$ and CO in combustion reactions, which provide heat for the subsequent gasification reactions. The temperatures generated by the partial combustion reactions may range from approximately 700 degrees C. to 1600 degrees C. Next, steam 112 may be introduced into the gasifier 108 during a gasification step. The char may react with the $CO_2$ and steam to produce CO and hydrogen at temperatures ranging from approximately 800 degrees C. to 1100 degrees C. In essence, the gasifier 108 utilizes steam 112 and oxygen 107 to allow some of the feedstock 105 to be partially oxidized to produce CO and release energy, which drives a second reaction that converts further feedstock to hydrogen and additional $CO_2$.

In this way, the gasifier 108 manufactures a resultant gas (e.g., syngas 110). This resultant gas may include approximately 85% of CO and hydrogen in equal proportions, as well as $CH_4$, HCl, HF, COS, $NH_3$, HCN, and $H_2S$ (based on the sulfur content of the feedstock). This resultant gas may be termed untreated syngas, because it includes, for example, $H_2S$. The gasifier 108 may also generate waste, such as slag 114, which may be a wet ash material. This slag 114 may be removed during cooling of the untreated syngas in a syngas cooler, e.g., a radiant syngas cooler (RSC) 116. The RSC 116 may include features that may facilitate cooling of the syngas 110 as it flows within the RSC 116 and increase cooling efficiency. For example, while in the RSC 116, a flow pattern of the syngas 110 may contribute to the overall cooling efficiency of the RSC 116. The flow pattern of the syngas may be influenced by a configuration of the RSC 116. Accordingly, in certain embodiments, the RSC 116 may include structural features that may alter the flow pattern of the syngas 110 within the RSC 116, as will be discussed below with reference to FIG. 3. The flow pattern of the syngas 110 may increase convective and radiative heat transfer of the syngas 110 within the RSC 116. In other embodiments, the RSC 116 may include cooling tubes that may cool the syngas 110 via indirect heat transfer with a coolant flowing through the cooling tubes. A gas treatment unit or gas purifier 120 may be utilized to clean an untreated syngas 122 exiting the RSC 116. In one embodiment, the gas purifier 120 may include a water gas shift reactor. The gas purifier 120 may scrub the untreated syngas 122 to remove the HCl, HF, COS, HCN, and $H_2S$ from the untreated syngas 122, which may include separation of sulfur 124 in a sulfur processor 126. Furthermore, the gas purifier 120 may separate salts 130 from the untreated syngas 122 via a water treatment unit 132 that may utilize water purification techniques to generate usable salts 130 from the untreated syngas 122. Subsequently, the gas from the gas purifier 120 may include treated syngas 136 (e.g., the sulfur 124 has been removed from the syngas), with trace amounts of other chemicals, e.g., $NH_3$ (ammonia) and $CH_4$ (methane).

In some embodiments, a residual gas processor may be utilized to remove additional residual gas components, such as ammonia and methane, as well as methanol or any residual chemicals from the treated syngas. However, removal of residual gas components from the treated syngas 136 is optional, because the treated syngas 136 may be utilized as a fuel even when it includes the residual gas components, e.g., tail gas.

The treated syngas 136, which has undergone the removal of its sulfur containing components and a large fraction of its carbon dioxide, may be transmitted to a power block 140. For example, the power block 140 may include a combustor of a gas turbine engine, which may utilize the syngas 136 as combustible fuel. The gas turbine engine may drive a load, such as an electrical generator for producing electrical power. In certain embodiments, the power block 140 may also include a heat recovery steam generator. The heat recovery steam generator may utilize steam 142 produced by the RSC 116. In certain embodiments, the heat recovery steam generator may provide steam 144 to the gasifier 108, which may be utilized during the gasification process. Additionally, the heat recovery steam generator may provide steam to a steam turbine engine for power generation, e.g., an electrical generator driven by a steam turbine.

Figure 2:
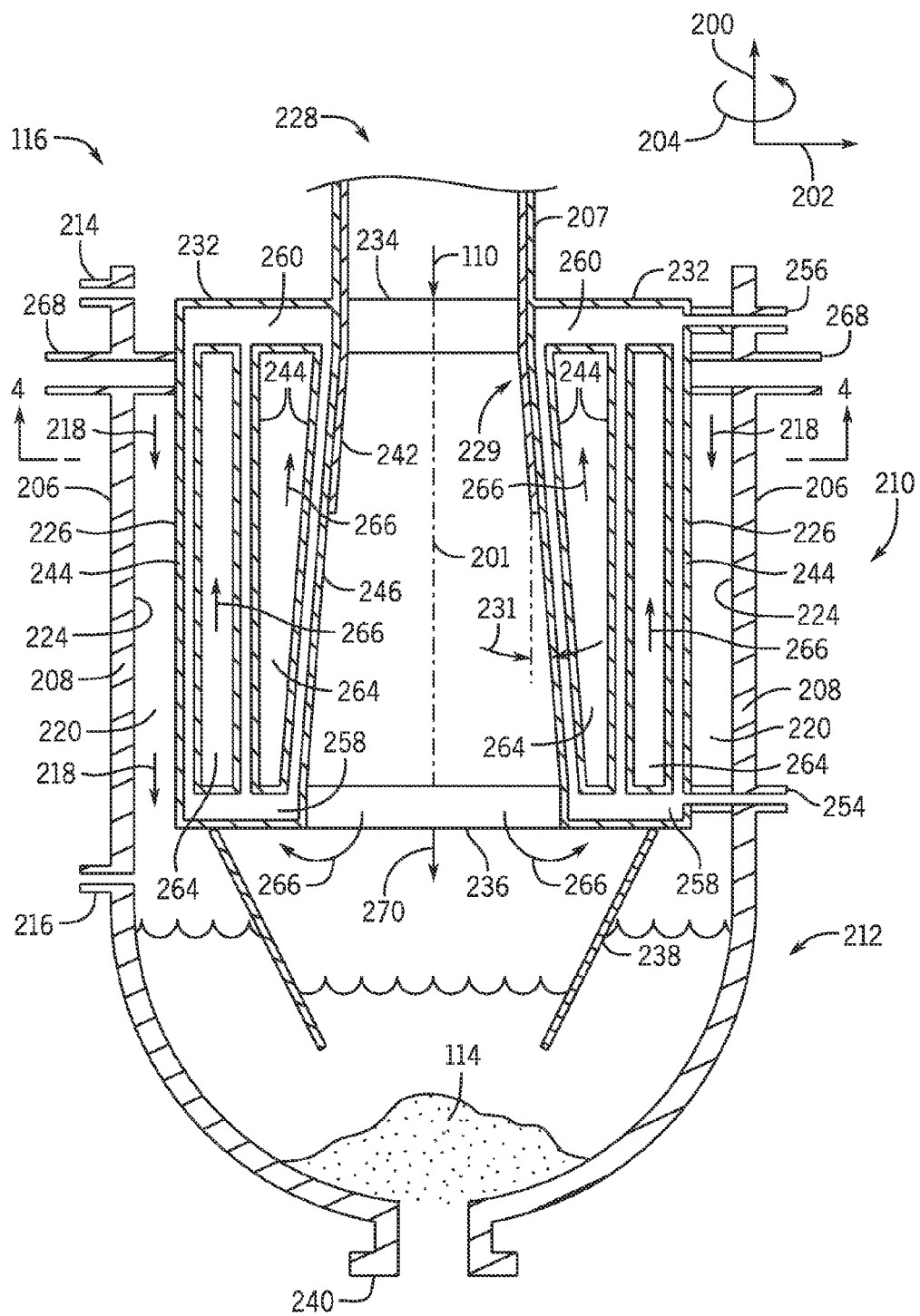
FIG. 2 is a cross-sectional side view of an embodiment of the syngas cooler of FIG. 1.

As discussed above, the syngas exiting the gasifier 108 may be cooled within the RSC 116. Accordingly, present embodiments include an RSC configured to alter the flow pattern of the syngas to facilitate cooling and removal of particulates from the syngas, improving the overall cooling efficiency of the RSC. FIG. 2 is a cross-sectional side view of an embodiment of the RSC 116 for use with the gasification system 100 of FIG. 1 (e.g., IGCC, MTO, or SNG). Various aspects of the RSC 116 may be described with reference to an axial direction or axis 200, a radial direction or axis 202, and a circumferential direction or axis 204. For example, the axis 200 corresponds to a longitudinal centerline 201 or lengthwise direction, the axis 202 corresponds to a crosswise or radial direction relative to the longitudinal centerline 201, and the axis 204 corresponds to the circumferential direction about the longitudinal centerline 201. During gasification, the syngas generated in the gasifier 108 may be mixed with particulates, e.g., the slag 114, which may be removed prior to transmission of the syngas to the power block 140. The RSC 116 may be useful for separating the particulates from the syngas (e.g., syngas 110). Moreover, it may be beneficial to cool the syngas prior to transmission via the RSC 116.

The RSC 116 may include a vessel 206 (e.g., an annular vessel) that may act as an enclosure for the RSC 116. The vessel 206 includes a throat 207, configured to be coupled to the gasifier 108, and a shell 208 (e.g., an annular shell) that functions as a housing or outer casing for the vessel 206. In addition, the shell 208 encloses both an upper region 210 (e.g., upper annular shell portion) and a lower region 212 (e.g., lower annular shell portion) of the RSC 116. The shell 208 includes an inlet 214 (e.g., a radial port) and an outlet 216 (e.g., a radial port) for circulating a seal gas, indicated by arrows 218, within the vessel 206. The seal gas 218 flows through a passage 220 (e.g., annular passage or circumferential array of passages) between an inner wall 224 (e.g., annular wall) of the shell 208 and an outer wall 226 (e.g., annular wall) of a cooling chamber 228 within the vessel 208. Furthermore, the seal gas 218 flowing through the passage 220 may protect the cooling chamber 228 from deformation (e.g., buckling) due to the high temperature and high pressure of the syngas entering the RSC 116. The cooling chamber 228 may include a first section 230 and a second section 232. The second section 232 runs along the axis 204 and surrounds the first section 230. For example, the first and second sections, 230 and 232, may be concentric annular sections. The cooling chamber 228 also includes a first opening 234 (e.g., central axial opening) and a second opening 236 (e.g., central axial opening) that provide a passage for the syngas (e.g., syngas 110) to circulate through the RSC 116. In certain embodiments, the first opening 234 may have a smaller width than the second opening 236, such that the cooling chamber 228 has a tapered structure (e.g., a conical structure or curved annular structure). For example, the first opening 234 may have a first width that is approximately 10 to 90, 20 to 80, 30 to 70, or 40 to 60 percent of a second width of the second opening 236. For example, the tapered structure 228 may have a taper angle 231 relative to the centerline 201, wherein the taper angle 231 may be 1 to 60, 1 to 45, 1 to 30, or 5 to 15 degrees. The first opening 234 may receive the syngas, as indicated by arrow 110, from the gasifier 108. As the syngas 110 flows through the cooling chamber 228, the particulates, e.g., slag 114, may separate from the syngas 110 and fall into a sump 238 or lock hopper, which is connected below the opening 240, through the second opening 236. In certain embodiments, the sump 238 may be filled with water or one or more chemicals to facilitate cooling of the particulates (e.g., slag 114) for easier removal through a solids outlet 240.

As discussed above, the high-temperature and high-pressure syngas 110 enters the RSC 116 through the first opening 234. Therefore, to minimize undesirable effects that may be caused by the high-temperature and high-pressure syngas 110 during heat transfer in the RSC 116, a portion of the first section 230 may include a protective barrier 242 to mitigate the undesirable effects that may be caused by the high-temperature and high-pressure syngas 110 entering the RSC 116. For example, the protective barrier 242 helps to protect the RSC 116 against any possibility of the high-temperature and high-pressure syngas 110 causing critical heat flux (CHF), i.e., a sudden decrease in a heat transfer coefficient of a surface where a phase change occurs (e.g., evaporation or film boiling of a liquid). As the syngas 110 flows into the cooling chamber 228, the protective barrier 242 helps to protect the RSC 116 against the high-temperature of the syngas 110 causing localized overheating of heat transfer surfaces within the cooling chamber 228, while also helping to improve heat transfer efficiency. By incorporating the protective barrier 242 on a portion of the first section 230, localized heating of the heat transfer surfaces may be reduced. The protective barrier 242 may act as a physical barrier, a thermal barrier, a chemical barrier, or any combination thereof. In one embodiment, the protective barrier 242 may cover up to approximately 50% or more of the first section 230. For example, the protective barrier 242 may cover approximately 1%, 5%, 10%, 15%, 20%, 25%, 30%, 35%, 40%, or more of the first section 230. In other embodiments, the protective barrier 242 may only cover the first opening 234 of the cooling chamber 228. The protective barrier 242 may include materials such as, but not limited to, refractory material, refractory metals, non-metallic materials, clays, ceramics, cements, and oxides of chromium, aluminum, silicon, magnesium, and calcium. In addition, the materials used for the protective barrier 242 may include bricks, castable, coatings, or any combination thereof. Furthermore, in certain embodiments, the protective barrier 242 may include a cooling wall or a surface wetting film for additional protection.

While in the RSC 116, the syngas 110 may be cooled in the cooling chamber 228 via heat exchange with a coolant (e.g., a gas and/or liquid coolant, such as water). Accordingly, in certain embodiments, the RSC 116 may function as a heat exchanger, such as a shell-and-tube heat exchanger. Alternatively, the syngas 110 may flow through the shell or passages between tubes, and the coolant may flow through one or more tubes. In addition to cooling the syngas 110, the RSC 116 may also remove undesired particulates (e.g., slag 114) from the syngas. As such, in the present embodiments, the cooling chamber 228 may include cooling tubing to facilitate cooling of the syngas 110 via heat exchange with the coolant as the syngas 110 flows through the RSC 116. The cooling tubing may include a plurality of tubes 244 (e.g., axial tubes) within the second section 232 along the radial axis 202 and circumferential axis 204 of the RSC 116. In other words, the plurality of tubes 244 may be spaced both radially (e.g., along the axis 202) and circumferentially (e.g., along the axis 204) between the outer wall 226 and an inner wall 246 of the second section 232. The plurality of tubes 244 may form a cage-like structure within the cooling chamber 228, as will be described in more detail below with reference to FIG. 4. In one embodiment, the plurality of tubes 244 may run parallel in direction with the vessel 206 relative to the axial axis 200 (e.g., centerline 201). In other embodiments, the plurality of tubes 244 may have a combination of parallel and slanted configurations relative to the centerline 201. For example, in the illustrated embodiment, the plurality of tubes 244 that coincide with at least a portion of the inner wall 246 (e.g., inner annular wall) of the cooling chamber 228 (e.g., the plurality of tubes 244 adjacent to the first section 230) may radially diverge away from the axial axis 200 (e.g., centerline 201) in the direction of the flow of the syngas 110 through the first section 230. Accordingly, the plurality of tubes 244 may define the tapered configuration 229 (e.g., conical structure) of the cooling chamber 228.

As illustrated in FIG. 2, the plurality of tubes 244 may receive the coolant through one or more inlets 254 (e.g., radial ports) and may route the coolant through one or more of the plurality of tubes 244 to one or more outlets 256 (e.g., radial ports). For example, the coolant may enter the inlets 254 and flow into a first channel 258 (e.g., annular channel) adjacent to the second opening 236 of the cooling chamber 224. The first channel 258 may be in fluid communication with one or more of the plurality of tubes 244. Similarly, the coolant may exit the plurality of tubes 244 through the outlets 256 via a second channel 260 (e.g., annular channel) adjacent to the first opening 234 of the cooling chamber 228. The coolant may be any suitable fluid for cooling the syngas, such as boiler feedwater or water from a steam drum. In certain embodiments, the cage-like structure formed by the plurality of tubes 244 includes passages 264 between each of the plurality of tubes 244 that receive the syngas after it has been redirected in an upward direction. As discussed below, the flow reversal of the syngas (e.g., first axial direction to opposite second axial direction) may help to slow the flow of the syngas, while also helping to cause particulates to drop out of the flow before reaching the plurality of tubes 244. The syngas may then be routed through the second section 232, as indicated by arrows 266, towards an outlet 268 where the syngas may exit the RSC 116 for further processing. The syngas passing through the passages 264 may be cooled via indirect heat exchange with the coolant passing though the plurality of tubes 244. In certain embodiments, a flow of the coolant may be concurrent (e.g., in the same direction) with respect to a flow of the syngas in the first section 230. In other embodiments, the syngas may flow counter-current to the flow of the coolant due to convective recirculation within the first section 230 as syngas flows towards the second opening 236. The countercurrent flow of the coolant may facilitate separation of particulates (e.g., slag) from the syngas (e.g., syngas 110) as the syngas flows towards the second opening 236.

During cooling of the syngas within the passages 264, the heat from the syngas may cause the coolant passing through the plurality of tubes 244 to vaporize, thereby producing steam, such as high-pressure steam (e.g., steam 142). The steam, which exits via the outlet 256, may be used as a source of heat elsewhere in the gasification system 100 (e.g., IGCC) and/or chemical plant (e.g., MTO and/or SNG), as described above with reference to FIG. 1. For example, the steam may be used as an input to the heat recovery steam generator (HRSG), the gas purifier system 120, a polygen system, a carbon capture system, a methanation system, a vapor absorption system, a process heat exchanger, a reactor, an attemperator, or any combination thereof. Accordingly, the RSC 116 advantageously cools the syngas and produces large quantities of high-pressure steam, which may have numerous applications for power generation. In addition to cooling the syngas, the RSC 116 may also be configured to condition the syngas. For example, as discussed above, cooling of the syngas may cause separation of the particulates (e.g., slag 114) within the syngas, causing the particulates to fall into the sump 238, as indicated by arrow 270.

As discussed above, the cooling chamber 228 may be arranged such that a portion of the plurality of tubes 244 (e.g., the plurality of tubes 244 that coincide with the inner wall 246) radially diverge from the axial axis 200 to form the tapered configuration 229. By arranging the plurality of tubes 244 that coincide with the inner wall 246 to form the tapered configuration 229, the cooling chamber 228 may have an increased surface area per unit volume. For example, while in the cooling chamber 228, the syngas 110 diffuses to fill the tapered configuration 229, and the diffusion may cool the syngas 110 and cause gasification by-products (e.g., slag) to separate out from the syngas 110 before the syngas 110 reaches the plurality of tubes 244. In addition, the flow reversal of the syngas 110 (e.g., from the first axial direction to the opposite second axial direction) may help to slow the flow of the syngas 110, and thus cause the particulates to drop out of the flow before the syngas 110 reaches the plurality of tubes 244. Therefore, the amount of fouling of heat transfer surfaces (e.g., surfaces of the plurality of tubes 244) may be reduced within the tapered configuration 229 and flow reversal because less gasification by-products impinge on the plurality of tubes 244. Accordingly, with less fouling, the plurality of tubes 244 may have better efficiency for heat transfer. Additionally, the diffusion of the syngas 110 may induce a turbulent flow of the syngas 110, which may improve circulation and further facilitate cooling of the syngas 110. Therefore, the cooling efficiency of the RSC 116 may be increased due to the tapered configuration 229 and the flow reversal of the syngas 110 before reaching the plurality of tubes 244. Furthermore, the tapered configuration 229 may decrease a velocity of the syngas 110 due to diffusion, as described in detail below with reference to FIG. 3, and thereby increase a residence time of the syngas 110 within the cooling chamber 228.

Figure 3:
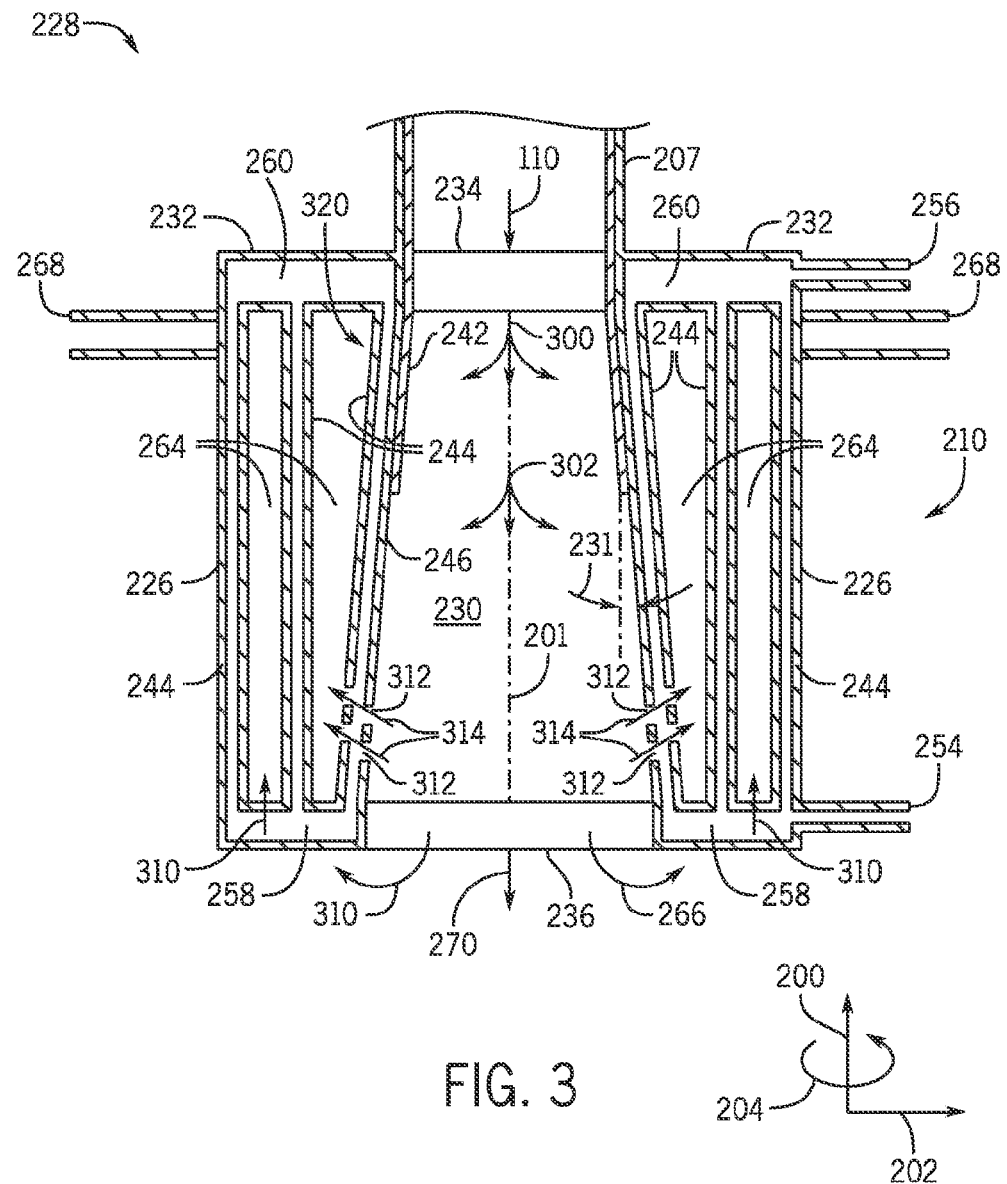
FIG. 3 is a cross-sectional side view of an embodiment of a cooling chamber within the syngas cooler of FIG. 2.

FIG. 3 illustrates a portion of the cooling chamber 228. In the depicted embodiment, the syngas, arrow 110, enters the first section 230 through the first opening 234 at a velocity $v_o$ and a momentum $p_o$. As the syngas 110 flows through the first section 230, the syngas diffuses (e.g., expands) in the tapered configuration 229, as indicated by arrows 300 and 302, to fill the wider portion of the first section 230. Accordingly, the flow pattern of the syngas changes from a generally parallel flow, with respect to the axial axis 200 (e.g., centerline 201), to a combination of parallel and radial flow, as the syngas radially diffuses to fill the first section 230. That is, the flow of the syngas 110 diverges away from the centerline 201 towards the inner wall 246 as it flows downward towards the second opening 236. The diffusion of the syngas within the cooling chamber 228 may cause the velocity and momentum (e.g., $v_o$ and $p_o$) of the syngas 110 to decrease. Consequently, the residence time of the syngas 110 within the first section 230 may increase and more efficient cooling may be achieved in the tapered configuration 229. Moreover, diffusion of the syngas 110 through the tapered configuration 229 of the first section 230 may improve circulation of the syngas and facilitate radiative and mixed convective heat transfer of the syngas 110. In certain embodiments, an orifice plate may be placed at the first opening 234 to restrict the flow and further reduce the velocity and momentum of the syngas 110 as it enters the first section 230, as will be discussed in more detail below with reference to FIG. 5, The reduced velocity and momentum of the syngas 110 within the first section 230 may also minimize impingement velocities of the syngas 110 on the heat transfer surfaces (e.g., surface of the plurality of tubes 244). For example, fouling components within the syngas 110, such as particulates or slag 114, may be less likely to deposit on the heat transfer surfaces, because the decreased impingement velocities of the syngas 110 may reduce the ability of particulates to adhere to the heat transfer surfaces (e.g., the plurality of tubes 244). Accordingly, fouling of the heat transfer surface may be reduced with the tapered configuration 229. Additionally, as the syngas 110 cools within the first section 230, any particulates present in the syngas may fall into the sump 238 (e.g., by gravity) before reaching the heat transfer surfaces of the plurality of tubes 244. As discussed above, diffusion of the syngas 110 as it fills the first section 230 results in cooling of the syngas 110. The cooling may result in density changes of the syngas components (e.g., CO, $H_2$, $H_2S$, slag, etc.). Therefore, at least a portion of components having a high density, such as particulates or slag 114, may begin to fall into the sump 238 before reaching the heat transfer surfaces of the plurality of tubes 244, and the less dense components (e.g., CO, $H_2$, $H_2S$, etc) may flow into the second section 232. The flow reversal of the syngas 110 also helps to decrease the velocity and causes particulates to drop out of the flow of the syngas 110 before reaching the plurality of tubes 244. Accordingly, with the tapered configuration 229 and reversing the flow of the syngas 100, the amount of particulates reaching the heat transfer surfaces of the plurality of tubes 244 is reduced and less fouling of the heat transfer surfaces may occur.

Furthermore, the availability of more heat transfer surface area per unit volume may allow for the overall height of the RSC 116 to be reduced. In certain embodiments, the height of the plurality of tubes 244 may be reduced by up to 50% compared to a height of tubes used in RSCs having a cylindrical configuration and single pass flow, rather than the tapered configuration 229. The tapered configuration 229 of the cooling chamber 228 may also reduce the construction and commissioning costs as compared to a system having an RSC without the tapered configuration 229. For example, due to the decreased height of the RSC 116, it may be easier to install and integrate the RSC 116 into the gasification system 100 (e.g., IGCC, MTO, or SNG). Moreover, the RSC 116 may utilize less material due to the decreased height of the cooling chamber 228. Additionally, the cooling chamber 228, the plurality of tubes 244, and other components of the RSC 116 may be constructed from less expensive materials, because the heat transfer surfaces may be less prone to fouling. For example, the materials may include, but are not limited to, stainless steel, such as SS310 and SS316L, nickel-chromium alloys, such as Inconel 625, Inconel 800LC, and Inconel 825, or any other suitable material and combinations thereof.

Once the syngas has diffused throughout the cooling chamber 228 (e.g., expand in a downward axial direction through the downwardly expanding tapered structure 229), the syngas may flow out through the second opening 236 and flow upward into the passages 264 in the second section 232, as indicated by arrows 310. The syngas 110 may flow through the passages 264 between the plurality of tubes 244. While in the passages 264, the syngas 110 may be cooled by indirect heat exchange with the coolant flowing through the plurality of tubes 244. Similar to the residence time of the syngas 110 within the first section 230, the syngas 110 within the second section 232 may also have an increased residence time due to the tapered configuration 231 of the second section 232 (e.g., syngas expands in an upward axial direction through the upwardly expanding tapered structure 231). As illustrated, the tapered configurations 229 and 231 are concentric, oppositely oriented expanding annular chambers, such that syngas 110 expands in both downward and upward directions. Accordingly, a more effective heat transfer may be achieved compared to other configurations (e.g., cylindrical configurations), because the syngas may be in the second section 232 for a longer period of time. In certain embodiment, the syngas may flow into the passages 264 through by-pass passages 312 (e.g., radial openings) formed on the inner wall 246 of the cooling chamber 228, as indicated by arrows 314. The by-pass passages 312 may be formed by gaps between the plurality of tubes 244 that coincide with the inner wall 246 of the RSC 116.

Figure 4:
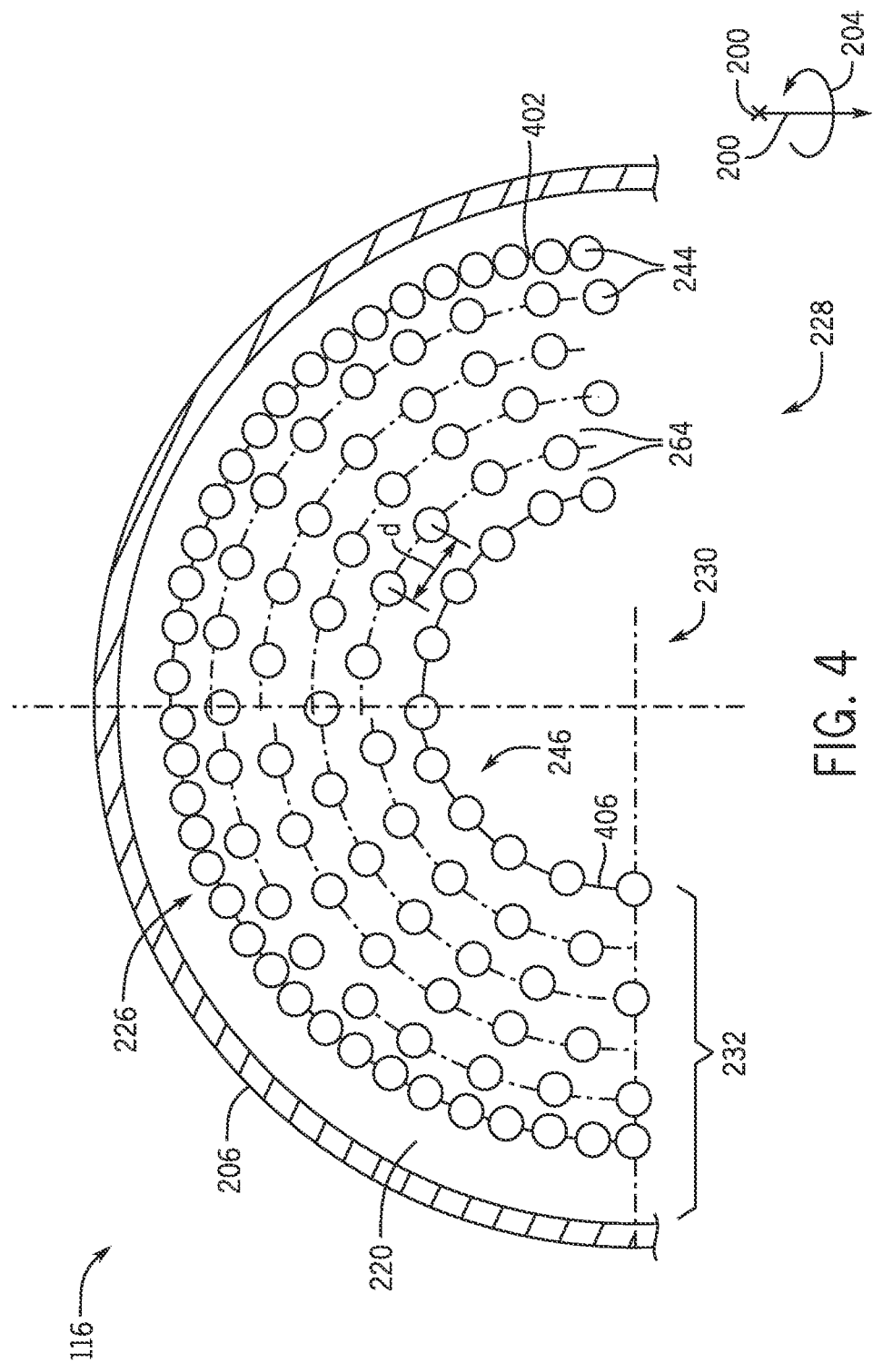
FIG. 4 is a radial cross-sectional view of an embodiment of the syngas cooler taken along line 4-4 of FIG. 2.

To facilitate cooling efficiency of the RSC 116, the plurality of tubes 244 may be placed at discrete locations radially and circumferentially around the first section 230. Turning now to FIG. 4, a radial cross-section of the RSC 116 taken along line 4-4 of FIG. 2 is illustrated. As discussed above, the plurality of tubes 244 may form a cage-like structure with the passages 264 between each of the plurality of tubes 244 providing a passage for the syngas to flow through the second section 232. In the illustrated embodiment, a first wall 402 may form a barrier between the plurality of tubes 244 that coincide with the outer wall 226 of the cooling chamber 228 and the passage 220. In certain embodiments, the first wall 402 may form a layer along the outer wall 226, such that the first wall 402 seals gaps between the plurality of tubes 244 that coincide with the outer wall 226 and blocks the influx of the seal gas 218 into the second section 232. In other embodiments, the first wall 402 may only be disposed within the gaps between the plurality of tubes 244 that coincide with the outer wall 226. In a further embodiment, the first wall 402 may be a separate structure not in contact with the plurality of tubes 244 adjacent to the passage 220. As such, the passages 264 may also be between the plurality of tubes 244 adjacent to the passage 220 and the first wall 402. The first wall 402 may include impermeable materials to minimize the flow of the seal gas 218 entering the second section 232. For example, the first wall 402 may include materials such as, but not limited to, nickel-chromium alloys, such as Inconel 625, Inconel 800LC, and Inconel 825, or any other suitable material and combinations thereof.

In addition to the first wall 402, the second section 232 may also include a second wall 406 (e.g., a membrane wall with one or more openings, e.g., by-pass passages 312) on the inner wall 246 of the cooling chamber 228. Similar to the membrane wall 402, the second wall 406 may seal gaps between the plurality of tubes 244 to keep the syngas within the first section 230 from flowing into the second section 232 prematurely. That is, the second wall 406 may block the syngas from entering the second section 232 before the undesirable components (e.g., particulates or slag 114) of the syngas have been removed. In certain embodiments, the second wall 406 may include the by-pass passages 312 to allow a partial flow of the syngas into the second section 232 before reaching the second opening 236. For example, the by-pass passages 312 may be disposed near the second opening 236, as shown in FIG. 3. This may allow a portion of the syngas to expand into the second section 232, further cooling and reducing the velocity of the syngas and increasing the residence time of the syngas within the second section 232. Although the by-pass passages 312 may have any suitable dimensions, in certain embodiments, the by-pass passages 312 may be approximately between 1 to 30, 2 to 20, 3 to 15, or 4 to 10 percent of the overall height of the cooling chamber 228.

As discussed above, the tapered configuration 229 of the cooling chamber 228 may increase the residence time of the syngas 110, which may result in improved cooling efficiency of the RSC 116. In addition, the tapered configuration 231, tube diameter, and spacing of the plurality of tubes 244 in the second section 232 may also influence the residence time of the syngas and cooling efficiency of the heat transfer surfaces within the second section 232. For example, similar to diffusion of the syngas flow through the tapered configuration 229 in the first section 230, the tapered configuration 231 in the second section 232 causes diffusion of the syngas flow, which increases the residence time of the syngas around the plurality of tubes 244. By further, incorporating tubing having a large diameter may provide more heat transfer surface area per unit volume, however large diameter tubes may occupy more space and may reduce the amount of available space for syngas diffusion within the second section 232. Similarly, tubing have a smaller diameter may facilitate diffusion of the syngas within the second section 232. However, the heat transfer surface area may be less and cooling efficiency may be decreased. Therefore, a balance between tube diameter and spacing may need be selected to achieve a desired cooling efficiency and increased residence time of the syngas within the second section 232. For example, in certain embodiments, the plurality of tubes 244 may have an outer diameter of between approximately 2 centimeters to 16 centimeters and an inner diameter of between approximately 1 centimeter to 12 centimeters. Such tube diameters may provide a desired heat transfer surface area and increased residence time for efficient cooling of the syngas.

Additionally, in certain embodiments, the plurality of tubes 244 may be arranged such that a distance d between each tube, measured from center to center of each tube, may be between approximately 1 to 4 times the outer diameter of the plurality of tubes 244. The plurality of tubes 244 may be arranged circumferentially axis 204 in rows (e.g., annular rows of the plurality of tubes 244) about the axis 200, such as concentric annular rows of the plurality of tubes 244. In one embodiment, the rows of the plurality of tubes 244 may be radially aligned with each other along the radial axis 202. In other embodiments, the rows of the plurality of tubes 244 may be staggered along the radial axis 202 to provide a more compact arrangement and provide desired diffusion spacing for the syngas between the plurality of tubes 244. The staggered row arrangement of the plurality of tubes 244 may allow the syngas within the second section 232 to flow between the rows of the plurality of tubes 244 and facilitate expansion of the syngas. In the illustrated embodiment, the plurality of tubes 244 that coincide with the outer wall 226 are more compact and, in conjunction with the membrane wall 402, may form a barrier to keep the syngas from flowing into the passage 220. As should be appreciated, because of the tapered configuration 231 of the second section 232, the distance d between a portion of the plurality of tubes 244 near the channel 260 may be wider than the distance d between the plurality of tubes 244 near the channel 258.

Figure 5:
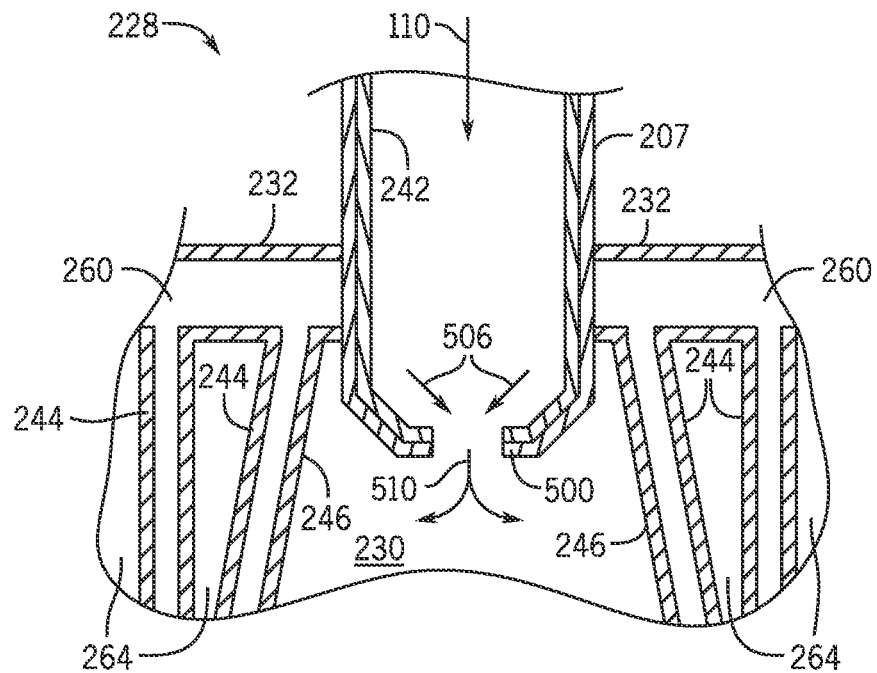
FIG. 5 is a cross-sectional side view of an embodiment of a top portion of the cooling chamber of FIG. 3.
Figure 6:
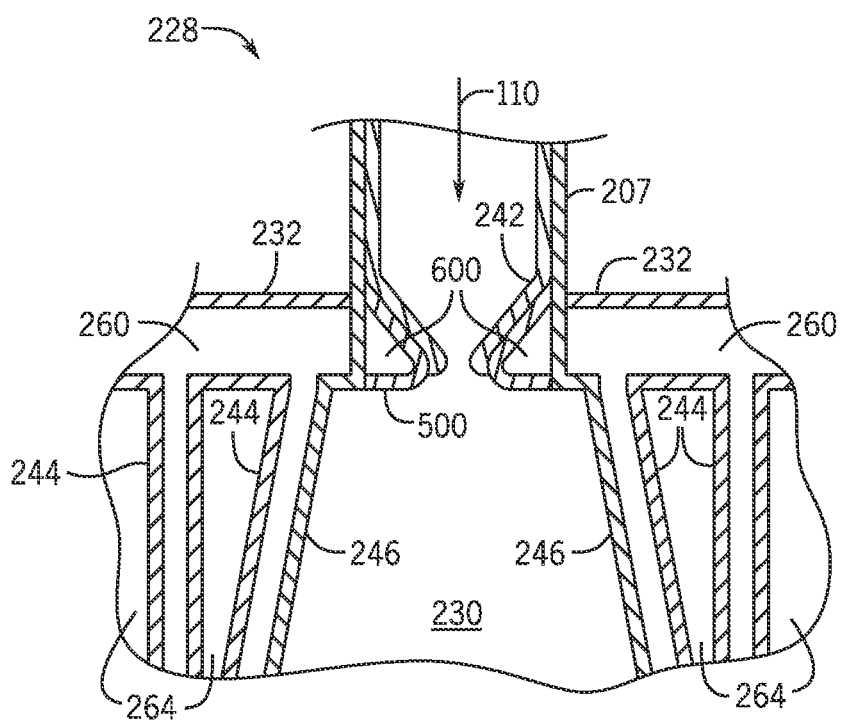
FIG. 6 is a cross-sectional side view of an embodiment of a top portion of the cooling chamber of FIG. 3.
Figure 7:
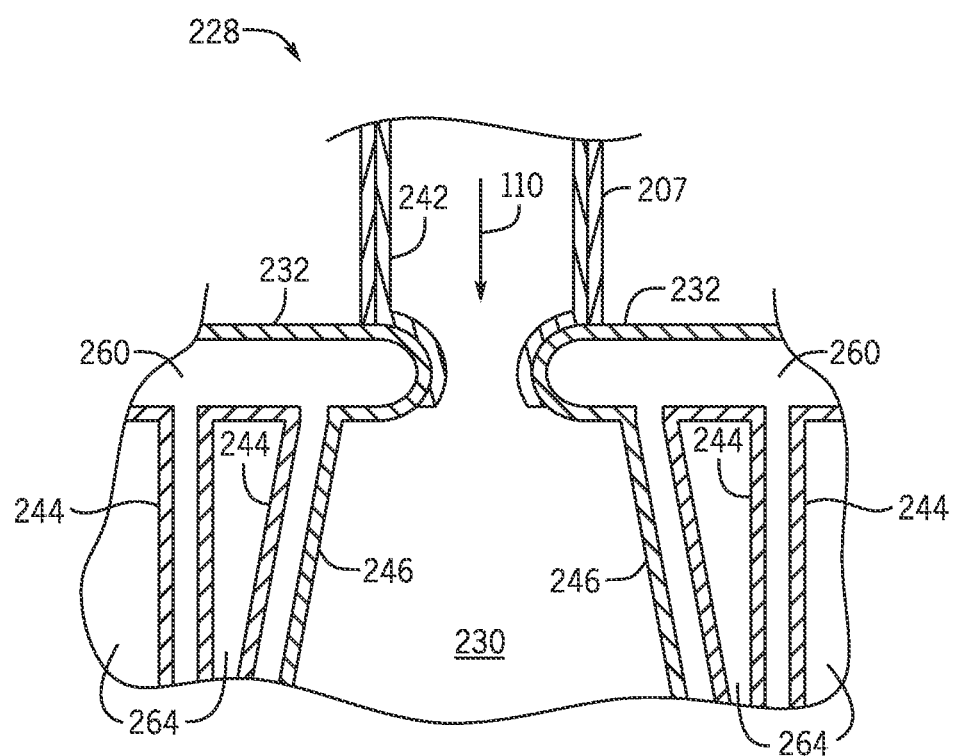
FIG. 7 is a cross-section side view of an embodiment of a top portion of the cooling chamber of FIG. 3.

As discussed above, with reference to FIG. 2, the RSC 116 may include an orifice plate to restrict and reduce the momentum of the syngas (e.g., syngas 110) as it flows from the gasifier 108 into the RSC 116. Turning now to FIG. 5, a portion of the RSC 116 including an orifice plate 500 is illustrated. In the illustrated embodiment, an orifice plate 500 is disposed on a distal end of the throat 207 of the RSC 116. In certain embodiments, the orifice plate 500 is lined with the protective barrier 242. However, the orifice plate 500 may be used without the protective barrier 242. As the syngas flows out of the gasifier 108 and into the throat 207, as indicated by arrow 110, the orifice plate 500 may cause the syngas to converge, as indicated by arrows 506. Convergence of the syngas as it flows through the orifice plate 500 causes a change in the velocity and pressure of the syngas. Further, once the syngas flows past the orifice plate 500, the syngas expands to fill the cooling chamber 228, as indicated by arrow 510. The expansion of the syngas further decreases the velocity. Accordingly, impingement velocities on the inner wall 246 may be decreased and the residence time of the syngas within the cooling chamber 228 may be increased. Moreover, the change in velocity and flow pattern (e.g., diffusion) of the syngas caused by the orifice plate 500 facilitates convective heat transfer via the Joule-Thomson effect. Generally, the Joule-Thomson effect states that an increase in potential energy of a gas due to expansion causes a decrease in kinetic energy of the gas, and therefore cooling the gas without heat exchange with surrounding surfaces. Accordingly, cooling the syngas in the manner described above (e.g., by incorporating the orifice plate 500) may reduce thermal stress of the heat transfer surfaces in the first section 230 as a result of the decrease in temperature of the syngas caused by the expansion. Moreover, because of the reduced thermal stress on the heat transfer surfaces, less expensive materials may be used in the construction of these surfaces, as described above. The orifice plate 500 may have any desired configuration that facilitates convergence of the syngas flowing from the gasifier 108 into the RSC 116. For example, FIGS. 6 and 7 illustrate other possible configurations of the orifice plate 500 that may provide the desired convergence and cooling of the syngas as it flows into the RSC 116. For example, in FIG. 6 the orifice plate 500 may only be attached to certain portions of the throat 207, creating a passage 600 between the orifice plate 500 and a portion of the throat 207. In other embodiments, as illustrated in FIG. 7, a portion of the channel 260 may extend into the throat 207 to form the orifice plate and narrow the first opening 234, causing convergence of the syngas flowing into the first section 230.

As described above, certain embodiments of the radiant syngas cooler 116 may include arranging a portion the plurality of tubes 244 surrounding the first section 230 at an angle to form the tapered configurations 229 and 231. The tapered configurations 229 and 231 of the RSC 116 may decrease the velocity of the syngas 110, and thereby increase the residence time of the syngas 110 within the RSC 116. Additionally, the tapered configurations 229 and 231 of the RSC 116 may reduce fouling of the heat transfer surfaces by facilitating removal of gasification by-products before reaching the heat transfer surfaces (e.g., the plurality of tubes 244). Thus, the tapered configurations 229 and 231 may increase the overall cooling efficiency of the RSC 116. Moreover, the RSC 116 may include other features (e.g., orifice plate 500) to restrict the flow of the syngas 110 from the gasifier 108 into the RSC 116, and further decrease the velocity of the syngas 110 within the RSC 116.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
   a gasifier configured to gasify a feedstock to produce a syngas; and
   a syngas cooler comprising a cooling chamber having a tapered configuration, wherein the cooling chamber comprises:
      a first section disposed downstream of the gasifier along a centerline of the syngas cooler and configured to separate particulates from the syngas and comprising a first opening and a second opening, wherein the first opening is fluidly coupled to the gasifier and has a smaller width than the second opening, and the first section is configured to decrease a velocity of the syngas;
      a second section in fluid communication with the first section comprising a plurality of tubes surrounding the first section, wherein a first portion of the plurality of tubes is arranged parallel to a longitudinal axis of the cooling chamber, and wherein a second portion of the plurality of tubes is angled such that the second portion of the plurality of tubes forms the tapered configuration, and the radiant syngas cooler is configured to flow a coolant through the plurality of tubes;
      a membrane wall configured to separate the first section from the second section, wherein the membrane wall blocks a flow of the syngas into the second section; and
      a passage circumferentially about the second section, wherein the passage is in fluid communication with a seal gas and configured to flow the seal gas between a shell of the radiant syngas cooler and the second section, wherein the shell encloses the cooling chamber.

2. The system of claim 1, wherein the second portion of the plurality of tubes at least partially defines an inner wall of the cooling chamber.

3. The system of claim 1, comprising a wall adjacent to the plurality of tubes and configured to separate the second section from the passage.

4. The system of claim 3, wherein the wall is configured to block a flow of the seal gas into the second section.

5. The system of claim 1, wherein the membrane wall comprises one or more by-pass passages configured to allow the flow of a portion of the syngas from the first section into the second section.

6. The system of claim 5, wherein the one or more by-pass passages comprise gaps between the second portion of the plurality of tubes.

7. The system of claim 1, wherein the second opening is in fluid communication with the second section.

8. The system of claim 1, wherein the first opening comprises an orifice plate configured to restrict a flow of the syngas into the first section.

9. A system, comprising:
   a vessel, comprising:
      a cooling chamber comprising:
         a first section configured to be disposed downstream of a gasifier and along a centerline of the vessel, wherein the first section comprises comprising a first opening and a second opening, the first opening is configured to be fluidly coupled to the gasifier and is configured to receive a syngas from the gasifier the first opening has a smaller width than the second opening, and the first section is configured to decrease a velocity of the syngas;
         a second section in fluid communication with the first section and comprising a plurality tubes, wherein a first portion of the plurality of tubes is arranged parallel to a longitudinal axis of the vessel, and a second portion of the plurality of tubes is angled relative to the centerline axis of the vessel such that the second portion of the plurality of tubes forms a tapered configuration;
         a membrane wall configured to separate the first section from the second section, wherein the membrane wall blocks a flow of the syngas into the second section: and
         a passage circumferentially about the cooling chamber, wherein the passage is in fluid communication with a seal gas and configured to flow the seal gas between a shell of the vessel and the second section, wherein the shell encloses the cooling chamber.

10. The system of claim 9, wherein a first portion of the plurality of tubes at least partially defines an outer wall of the cooling chamber.

11. The system of claim 9, wherein the second portion of the plurality of tubes at least partially defines an inner wall of the cooling chamber.

12. The system of claim 9, wherein the first opening comprises an orifice plate configured to restrict the flow of the syngas into the first section.

13. The system of claim 9, wherein the membrane wall comprises one or more by-pass passages configured to allow the flow of a portion of the syngas from the first section into the second section, wherein the flow of the portion of the syngas through the by-pass passages further decreases a velocity of the portion of the syngas to increase a residence time of the portion of the syngas within the second section.

14. The system of claim 9, wherein a portion of the first section comprises a refractory material.

15. The system of claim 9, wherein the second section is disposed circumferentially about the first section.

16. The system of claim 9, wherein the first portion of the plurality of tubes and second portion of the plurality of tubes are fluidly coupled to one another.

* * * * *